(12) United States Patent
Kim

(10) Patent No.: US 7,365,512 B2
(45) Date of Patent: Apr. 29, 2008

(54) SYSTEM FOR DIRECTING MOVING OBJECT

(75) Inventor: Young-gie Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 11/489,510

(22) Filed: Jul. 20, 2006

(65) Prior Publication Data
US 2007/0018081 A1    Jan. 25, 2007

(30) Foreign Application Priority Data
Jul. 22, 2005    (KR)    ............ 10-2005-0066971

(51) Int. Cl.
*G05B 1/06*    (2006.01)
(52) U.S. Cl. ............... 318/638; 318/560; 901/1; 901/47; 701/207; 701/209
(58) Field of Classification Search ........... 318/560, 318/638; 901/1, 47; 701/207, 209
See application file for complete search history.

(56) References Cited

U.S. PATENT DOCUMENTS

| | | | | |
|---|---|---|---|---|
| 4,964,265 A | * | 10/1990 | Young | ............ 56/10.8 |
| 5,711,388 A | * | 1/1998 | Davies et al. | ............ 180/168 |
| 6,271,788 B1 | * | 8/2001 | Longaker et al. | ...... 342/357.03 |
| 6,404,159 B1 | * | 6/2002 | Cavallini | ............ 318/587 |
| 6,640,164 B1 | * | 10/2003 | Farwell et al. | ............ 701/2 |
| 2005/0156562 A1 | * | 7/2005 | Cohen et al. | ............ 320/107 |

* cited by examiner

*Primary Examiner*—Rita Leykin
(74) *Attorney, Agent, or Firm*—Birch, Stewart, Kolasch & Birch, LLP

(57) ABSTRACT

A moving-object directing system for directing a moving object to a target location includes: a moving-object directing unit and a moving object. The moving-object directing unit includes: a directing signal transmitter for generating a first moving-object directing signal, sequentially transmitting the first moving-object directing signal 360° in all directions, generating a second moving-object directing signal corresponding to directing information for directing the moving object to the target location upon receiving a signal indicating successful reception of the first moving-object directing signal, and transmitting the second moving-object directing signal, and a first RF (Radio Frequency) communication unit for receiving a signal indicating successful reception of the moving-object directing signal. The moving object includes: a second RF communication unit for wirelessly transmitting a signal indicating successful reception of the moving object directing signal to the moving object directing unit, and a controller for controlling operations of a wheel.

18 Claims, 4 Drawing Sheets

SYSTEM FOR DIRECTING MOVING OBJECT

BACKGROUND OF THE INVENTION

1. Field of the Invention

The present invention relates to a system for directing a moving object, and more particularly to a system for directing a moving object such as a mobile robot to a charging device.

2. Description of the Related Art

Typically, a robot developed for industrial purposes is being widely used to achieve factory automation, and collects data or information on behalf of a human being under an extreme situation, which is unbearable for the human being.

Recently, the above-mentioned robotics technologies have been used for space industries, and have been rapidly developed in various ways, resulting in the implementation of human-friendly household robots.

The human-friendly household mobile robot uses a battery to guarantee mobility at any place. If a voltage charged in the battery is equal to or less than a predetermined voltage, the human-friendly household mobile robot is programmed to automatically return to a charging device, such that the battery is re-charged.

In order to normally return the mobile robot to the charging device, there is a need for the mobile robot to recognize its own relative location with respect to the charging device.

A representative technique for returning the mobile robot to the charging device is a method for employing output data of an encoder mounted to a moving wheel. This technique has a disadvantage in that it cannot compensate for errors caused by a slip or no-load rotation of the wheel, such that it is considered to be an undesirable method.

FIG. 1 is a conceptual diagram illustrating a conventional system for estimating a relative location of a robot acting as a moving object.

Referring to FIG. 1, the system includes a plurality of Beacon modules 100 installed to many places of a room ceiling, such that it estimates a relative location of a mobile robot 200. Each Beacon module 100 includes an ultrasound transmitter and a Radio Frequency (RF) receiver.

If the mobile robot 200 equipped with an ultrasound receiver and an RF transmitter requests ultrasound generation from the Beacon module 100, the Beacon module 100 transmits an ultrasound signal to the mobile robot 200 upon receipt of the request. Therefore, the mobile robot 200 calculates an arrival time of the ultrasound signal emitted from each Beacon 100, such that it can calculate a distance from the mobile robot 200 to each Beacon 100. And, the mobile robot 200 estimates its relative location, such that it can return to the charging device.

However, the above-mentioned system for employing the Beacon has a disadvantage in that a plurality of Beacons must be installed to many places of a room ceiling, such that the costs of implementing the system are unavoidably increased due to the use of many Beacons.

SUMMARY OF THE INVENTION

Therefore, the present invention has been made in view of the above problems, and it is an object of the invention to provide a moving object directing system for minimizing the costs of system implementation, and at the same time directing a moving object to a charging device without using additional modules.

It is another object of the present invention to provide a moving object directing system for correcting a moving locus of a moving object in real time, and rapidly directing the moving object to a target location.

In accordance with the present invention, the above and other objects can be accomplished by the provision of a moving-object directing system for directing a moving object to a target location comprising: a moving-object directing unit including: a directing signal transmitter for generating a first moving-object directing signal, sequentially transmitting the first moving-object directing signal 360° in all directions, generating a second moving-object directing signal corresponding to directing information for directing the moving object to the target location upon receiving a signal indicating successful reception of the first moving-object directing signal, and transmitting the second moving-object directing signal, and a first RF (Radio Frequency) communication unit for receiving a signal indicating successful reception of the moving-object directing signal; and the moving object including: a second RF communication unit for wirelessly transmitting a signal indicating successful reception of the moving object directing signal to the moving object directing unit, and a controller for controlling operations of a wheel according to directing information of the received moving-object directing signal.

Therefore, the moving-object directing system according to the present invention can direct a moving object (e.g., a mobile robot) to a target location on the basis of moving-object directing information, which is transmitted in real time from a moving-object directing unit (i.e., a charging device), such that a low-priced system capable of moving the moving object to the target location without using additional modules such as Beacons can be implemented.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
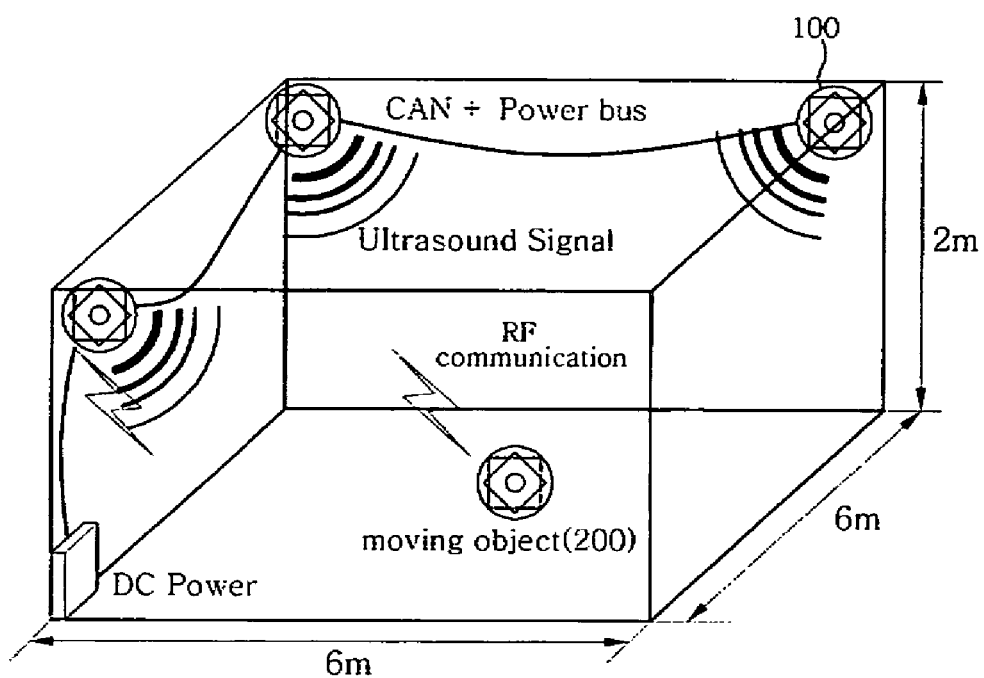
FIG. 1 is a conceptual diagram illustrating a conventional system for estimating a relative location of a mobile robot acting as a moving object.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Prior to describing the present invention, it should be noted that a term "moving object" is indicative of a mobile robot such as a cleaning- or household-robot. The mobile robot is movable by wheels, but may be an exemplary mobile robot based on joint mechanism as necessary.

Figure 2:
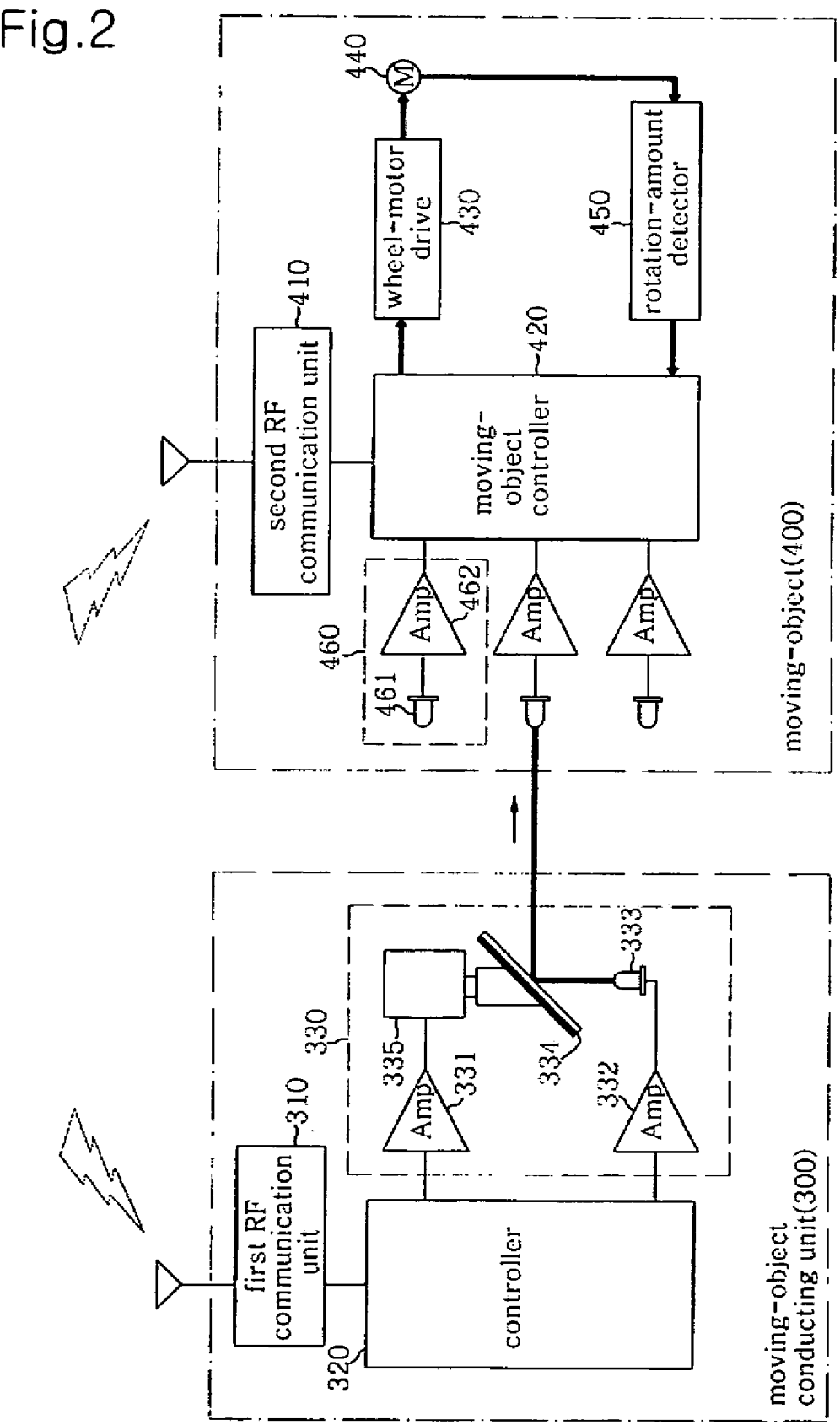
FIG. 2 is a block diagram illustrating a system for directing a moving object according to a preferred embodiment of the present invention.

FIG. 2 is a block diagram illustrating a system for directing a moving object according to a preferred embodiment of the present invention.

Referring to FIG. 2, the moving object directing system mainly includes a moving object directing unit 300 and a moving object 400.

The moving object directing unit 300 basically includes directing signal transmission units 320 and 330 and a first RF communication unit 310.

The directing signal transmission units 320 and 330 generate a first signal for directing the moving object 400, and output the first signal to the moving object 400. Upon receiving a response signal indicating successful reception of the first signal from the moving object 400, the directing signal transmission units 320 and 330 generate a second signal for directing the moving object 400 to direct the moving object 400 to a target location (e.g., a docking location of a charging device), and output the second signal to the moving object 400.

The first RF communication unit 310 receives a signal indicating successful reception of the second signal for directing the moving object 400.

The moving object directing unit 300 may be implemented with an additional module independent of the charging device. Preferably, the moving object directing unit 300 may be integrated with the charging device required for charging the battery of the moving object 400.

A detailed description of the above-mentioned moving object directing unit 300 will hereinafter be described with reference to FIG. 2.

Referring to FIG. 2, the moving object directing unit 300 includes the first RF communication unit 310 for communicating with the moving object 400 to inform the moving object 400 of the successful reception of the moving object directing signal.

The moving object directing unit 300 further includes moving-object directing signal generators 332 and 333 acting as transmitters of the directing signal, a reflective mirror 334, a mirror rotation unit 335, and a controller 320.

The moving-object directing signal generators 332 and 333 generate moving-object directing signals according to a control signal of the controller 320, and output the moving-object directing signals.

The moving-object directing signal generators 332 and 333 can be implemented with an amplifier 332 for amplifying a signal and an infrared transmitter equipped with an infrared LED (Light Emitting Diode) 333. Therefore, the above-mentioned moving-object directing signal corresponds to an infrared beam for directing the moving object, and includes specific information required for directing the moving object. A detailed description of the moving-object directing signal will be described at a later time.

In the meantime, the reflective mirror 334 reflects the moving-object directing signals generated from the moving object directing signal generators 332 and 333, and rotates by a rotation unit 335 (i.e., a motor) driven by the controller 320 by 360 degrees (i.e., 360°).

In more detail, the moving object directing signals generated from the moving object directing signal generators 332 and 333 may be emitted 360° in all directions by the reflective mirror 334 and the rotation unit 335.

The controller 320 controls operations of the moving-object directing unit 300 on the basis of control program data stored in an internal memory. For example, the controller 320 controls the moving object directing signal generation and a rotation angle of the reflective mirror 334, generates moving-object directing signals, and sequentially outputs the moving-object directing signals 360° in all directions.

Upon receiving a signal indicating successful reception of the moving object directing signal from the first RF communication unit 310, the controller 320 stops the swing of the reflective mirror 334, and generates a moving-object directing signal corresponding to a rotation angle of the reflective mirror 334, such that it performs tracking the moving object 400 until reaching the target location.

For reference, it is assumed that the above-mentioned reflective-mirror rotation angle information may be equal to moving-object directing information. And, the above-mentioned reflective-mirror rotation angle information may be defined as an offset angle of the moving object 400 on the basis of the target location (e.g., a docking location of the charging device).

In the meantime, the moving object 400 receives the moving-object directing signal from the moving-object directing unit 300, and moves to a target location according to the moving-object directing information contained in the received signal.

The moving object 400 includes a receiver 460 for receiving the moving object directing signal, as shown in FIG. 2. The receiver 460 can be implemented with an infrared receiver including both an infrared light-receiving unit 461 and an amplifier 462 for signal amplification. A plurality of receivers 460 may be used to enhance a receiving rate of the moving-object directing signal and a tracking performance as necessary.

If a plurality of receivers 460 are contained in the system, the controller 420 of the moving object 420 controls the wheel driving to receive the moving-object directing signal via a center infrared receiver from among the infrared receivers.

The moving object 400 further includes a second RF communication unit 410 to communicate with the moving-object directing unit 300. The controller 420 of the moving object 400 can transmit a signal indicating successful reception of the moving-object directing signal to the moving-object directing unit 300 via the second RF communication unit 410.

The controller 420 of the moving object 400 controls overall operations of the moving object 400 on the basis of control program data stored in the internal memory. For example, upon receiving the moving-object directing signal from the receiver 420, the controller 420 transmits a signal indicating successful reception of the moving-object directing signal to the moving-object directing unit 300 via the second RF communication unit 410, and controls the wheel driving according to directing information contained in the moving object directing signal transmitted from the moving-object directing unit 300.

For reference, the moving object 400 further includes a sensor unit composed of a plurality of sensors capable of detecting a cliff (or drop), pressure, and an obstacle in the same manner as in a general cleaning robot. And, the moving object 400 further includes a wheel-motor drive 430, a wheel motor 440, and a rotation-amount detector 450, such that it can move by operations of the above-mentioned components 430, 440, and 450.

The wheel-motor drive 430 drives a wheel motor M upon receiving a drive control signal from the controller 420. The rotation-amount detector 450 acting as an encoder connected to left and right wheels detects an amount of rotation of the left and right wheels, calculates rotation number data corresponding to the detected rotation amount, and transmits the calculated rotation number data to the controller 420.

Operations of the above-mentioned moving object directing system will hereinafter be described with reference to FIG. 4.

Figure 4:
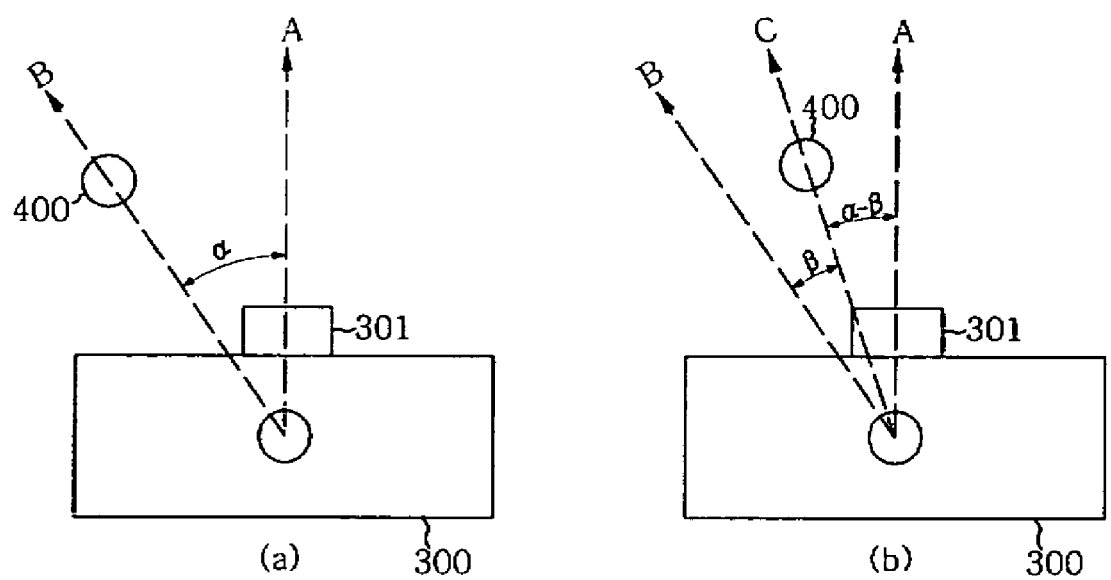
FIG. 4 is a conceptual diagram illustrating operations of a system for directing a moving object according to the present invention.

FIG. 4 is a conceptual diagram illustrating operations of a system for directing a moving object according to the present invention.

A reference number 300 is indicative of a charging device acting as a moving-object directing unit. A charging port 301 is located at the center of a lateral side of the charging device. A moving-object directing signal generator, a reflective mirror, and a reflective-mirror rotation unit are placed on the charging device, such that the moving-object directing signal may be emitted 360° in all directions.

For reference, provided that a docking location is placed at the center part of the charging port 301 is, the docking location and the moving-object directing signal generator are located at an A axis. In this case, the A axis may be set to a target location of the moving object 400.

As shown in FIG. 4(a), if the system desires to move the moving object 400 to the charging-device docking location on the condition that the moving object has been placed on a B axis, the moving-object directing unit 300 must firstly detect the location of the moving object 400.

The controller 320 of the moving-object directing 300 generates a control code capable of firstly generating the moving-object directing signal, and outputs the control code to the moving-object directing generators 332 and 333.

The moving-object directing generators 332 and 333 generate the moving-object directing signal according to the control code, and forwardly transmit the moving-object directing signal via the reflective mirror 334.

If the controller 320 does not receive the signal indicating successful reception of the moving-object directing signal via the first RF communication unit 310 after transmitting the moving-object directing signal, the controller 320 rotates the reflective mirror 334 by a predetermined angle by controlling the reflective-mirror rotation unit 335, and at the same time moves the reflective mirror 334. If the controller 320 re-generates a control code capable of generating the moving-object directing signal, a moving-object directing signal corresponding to the control code is emitted in another direction different from a previous direction.

Therefore, if the controller 320 controls the moving-object directing signal generation simultaneously with rotating the reflective mirror 334, the moving-object directing signal is emitted 360° in all directions.

For reference, if the controller 420 of the moving object 400 receives a moving object directing signal via the receiver 460 such as an infrared receiver, it transmits specific information indicating successful reception of the moving-object directing signal to the moving-object directing unit 300 via the second RF communication unit 410.

Therefore, if the controller 320 of the moving-object directing unit 300 receives a signal indicating successful reception of the moving-object directing signal via the first RF communication unit 310, while sequentially rotating the reflective mirror 334 and at the same time transmitting the moving object directing signal 360° in all directions, it is determined that the controller 320 of the moving-object directing unit 300 has detected the location of the moving object 400, such that it stops rotation of the reflective mirror 334.

If the location of the moving object 400 has been completely detected as described above, the controller 320 generates a control code corresponding to rotation angle information of the reflective mirror 334, and outputs the control code to the moving-object directing signal generators 332 and 333, such that the moving-object directing signal corresponding to the rotation angle information of the reflective mirror 334 can be transmitted to the receiver 460 of the moving object 400.

Therefore, the controller 420 of the moving object 400 receives the moving-object directing signal via the receiver 460, demodulates the received moving-object directing signal, acquires rotation angle information of the reflective mirror, and controls the wheel driving according to the acquired rotation angle information, such that it can access the target location.

For example, as shown in FIG. 4(a), if the moving object 400 is located at a specific location offset by a predetermined angle α from the target location A, the controller 420 of the moving object 400 acquires the reflective-mirror rotation angle information value α.

Therefore, the controller 420 of the moving object 400 moves to a direction for reducing the reflective-mirror rotation angle information value α, as shown in FIG. 4(b).

In this case, the controller 320 of the moving-object directing unit 300 can estimate a moving direction and a moving distance of the moving object 400. If the controller 320 rotates the reflective mirror 334 in the estimated direction to re-transmit the moving-object directing signal, and re-transmits the reflective-mirror rotation angle information according to the presence or absence of the received moving-object directing signal, the moving object 400 can reach the target location A by repetition of the above-mentioned operations of the controller 320.

If the moving object reaches the target location A, the controller 320 of the moving-object directing unit 300 continuously transmits the moving object directing signal on the condition that the reflective mirror 334 is fixed at a specific location. In this case, if the controller 420 of the moving object 400 controls the wheel driving to receive the moving-object directing signal via the receiver located at the center part from among several receivers 460, the moving object 400 can be rapidly and correctly directed to the charging port 301 along the A axis serving as the target location.

Therefore, the moving object directing system according to the present invention can easily direct the moving object 400 to the target location such as the charging device without using several communication modules such as Beacons.

Figure 3:
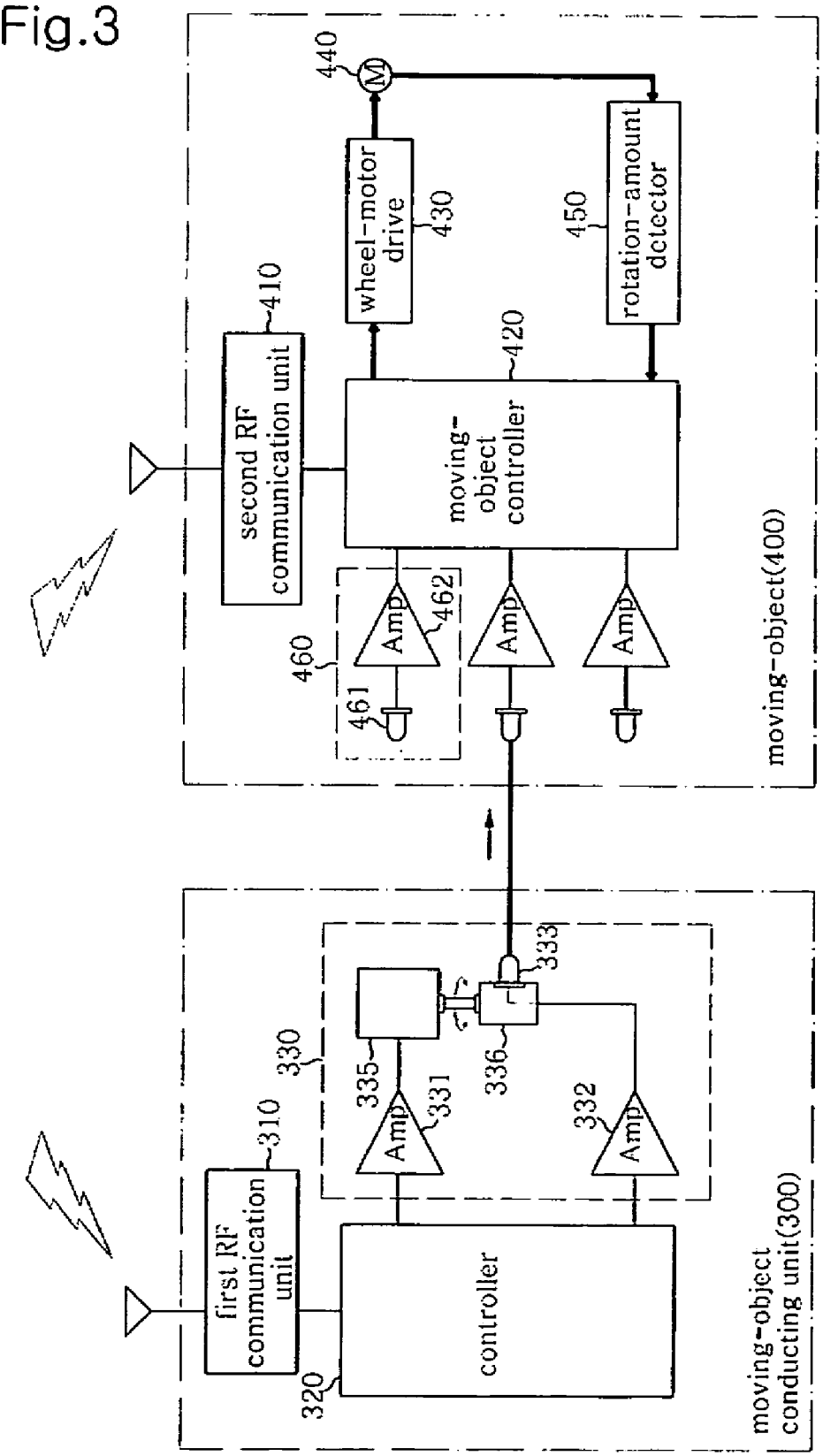
FIG. 3 is a block diagram illustrating a system for directing a moving object according to another preferred embodiment of the present invention.

As described above, although the moving object directing system according to the present invention sequentially rotates the reflective mirror 334 and transmits the moving-object directing signal 360° in all directions, the moving-object directing system may also be implemented by rotation of the infrared LED 333 corresponding to the moving object directing signal generator as shown in FIG. 3.

In other words, if a connector 336 coupled to the infrared LED 333 acting as the moving object directing signal generator is connected to a rotation axis of the motor acting as the rotation unit 335, the moving object directing signal generated from the infrared LED 333 can be rotated-outputted 360° in all directions according to the rotation of the motor.

FIG. 3 is a block diagram illustrating a system for directing a moving object according to another preferred embodiment of the present invention.

Unexplained reference numerals of FIG. 3 are identical with those of FIG. 2, such that a detailed description thereof will herein be omitted for the convenience of description. However, if the moving-object directing unit 300 of FIG. 3 receives a signal indicating successful reception of the moving-object directing signal via the first RF communication unit 310, it generates a moving-object directing signal corresponding to the rotation angle information of the moving-object directing signal generator 335.

Therefore, the moving object 400, having received the moving-object directing signal corresponding to the rotation angle information of the moving-object directing signal generator 335, can be directed to the target location A in the same manner as in FIG. 2, and can also be directed to the charging port 301 along the target location A.

As apparent from the above description, the moving-object directing system according to the present invention can direct a moving object (e.g., a mobile robot) to a target location on the basis of moving-object directing information, which is transmitted in real time from a moving-object directing unit (i.e., a charging device), such that a low-priced system capable of moving the moving object to the target location without using additional modules such as Beacons can be implemented.

In addition, the moving-object directing system according to the present invention corrects a moving locus of the moving object in real time, such that the moving object can be rapidly directed to the target location.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A moving-object directing system for directing a moving object to a target location comprising:
   a moving-object directing unit including:
      a directing signal transmitter for generating a first moving-object directing signal, sequentially transmitting the first moving-object directing signal 360° in all directions, generating a second moving-object directing signal corresponding to directing information for directing the moving object to the target location upon receiving a signal indicating successful reception of the first moving-object directing signal, and transmitting the second moving-object directing signal, and
      a first RF (Radio Frequency) communication unit for receiving a signal indicating successful reception of the moving-object directing signal; and
   the moving object including:
      a second RF communication unit for wirelessly transmitting a signal indicating successful reception of the moving object directing signal to the moving object directing unit, and
      a controller for controlling operations of a wheel according to directing information of the received moving-object directing signal.

2. The system according to claim 1, wherein the directing signal transmitter includes:
   a moving-object directing signal generator;
   a reflective mirror for reflecting the moving-object directing signal generated from the generator;
   a rotation unit for rotating the reflective mirror; and
   a controller for controlling the moving-object directing signal, and at the same time controlling a rotation angle of the reflective mirror.

3. The system according to claim 2, wherein the moving-object directing signal generator is an infrared transmitter.

4. The system according to claim 2, wherein:
   upon receiving the signal indicating successful reception of the moving-object directing signal via the first RF communication unit, the controller stops rotation of the reflective mirror, and controls generation of a moving-object directing signal corresponding to the reflective-mirror rotation angle information.

5. The system according to claim 4, wherein the reflective-mirror rotation angle information is indicative of an offset angle of the moving object on the basis of the target location.

6. The system according to claim 4, wherein the controller of the moving object controls wheel operations in a direction for reducing the reflective-mirror rotation angle information.

7. The system according to claim 2, wherein:
   if the controller does not receive the signal indicating successful reception of the moving object directing signal via the first RF communication unit, the controller rotates the reflective mirror by a predetermined angle.

8. The system according to claim 1, wherein the moving object includes:
   a wheel motor for rotating a wheel;
   a wheel-motor drive for driving the wheel motor; and
   a rotation-amount detector for detecting a rotation amount of the wheel,
   wherein the controller of the moving object controls the wheel according to the received moving-object directing information and a signal of the rotation-amount detector.

9. The system according to claim 7, wherein the moving object further includes a sensor unit composed of sensors capable of detecting an obstacle, pressure, and a cliff (or drop).

10. The system according to claim 1, wherein the moving object is a cleaning robot, and the moving-object directing unit is a charging unit for charging the cleaning robot with electricity.

11. The system according to claim 1, wherein:
   the moving object includes a plurality of receivers for receiving the moving-object directing signal, and
   the controller controls the wheel to receive the moving object directing signal via a center receiver from among the receivers.

12. The system according to claim 11, wherein the moving object is a cleaning robot, and the receiver is an infrared receiver.

13. The system according to claim 1, wherein the directing signal transmitter includes:
   a moving-object directing signal generator;
   a rotation unit for rotating the moving-object directing signal generator; and
   a controller for controlling generation of the moving-object directing signal, and at the same time controlling a rotation angle of the rotation unit.

14. The system according to claim 13, wherein the moving-object directing signal generator is an infrared transmitter.

15. The system according to claim 13, wherein:
   upon receiving the signal indicating successful reception of the moving-object directing signal via the first RF communication unit, the controller controls generation of the moving-object directing signal corresponding to rotation angle information of the moving object directing signal generator.

16. The system according to claim 15, wherein the rotation angle information of the moving-object directing signal generator is indicative of an offset angle of the moving object on the basis of the target location.

17. The system according to claim 15, wherein the controller of the moving object controls wheel operations in a direction for reducing the rotation angle information of the moving-object directing signal generator.

18. The system according to claim 13, wherein:
if the controller does not receive the signal indicating successful reception of the moving object directing signal via the first RF communication unit, the controller rotates the moving-object directing signal generator by a predetermined angle.

* * * * *